(12) United States Patent
Chappell

(10) Patent No.: US 6,860,128 B2
(45) Date of Patent: Mar. 1, 2005

(54) ANTI-THEFT CLAMP FOR A MOTOR CYCLE HAND BRAKE LEVER

(76) Inventor: Neils William Chappell, P.O. Box 37721, Parnell, Auckland (NZ)

( * ) Notice: Subject to any disclaimer, the term of this patent is extended or adjusted under 35 U.S.C. 154(b) by 71 days.

(21) Appl. No.: 10/275,570
(22) PCT Filed: May 8, 2001
(86) PCT No.: PCT/NZ01/00078
§ 371 (c)(1), (2), (4) Date: Nov. 7, 2002
(87) PCT Pub. No.: WO01/85530
PCT Pub. Date: Nov. 15, 2001

(65) Prior Publication Data
US 2003/0101779 A1 Jun. 5, 2003

(30) Foreign Application Priority Data
May 9, 2000 (NZ) ................................................ 504389

(51) Int. Cl.[7] ............................ F16H 57/00; G05G 5/00
(52) U.S. Cl. .................................. 70/202; 70/19; 70/211
(58) Field of Search .......................... 70/202, 19, 203, 70/211, 212; 188/24.18

(56) References Cited

U.S. PATENT DOCUMENTS

| | | | | | |
|---|---|---|---|---|---|
| 1,193,679 A | * | 8/1916 | Fox | ............................. | 70/199 |
| 4,326,747 A | * | 4/1982 | Finnegan | .................... | 294/147 |
| 4,426,861 A | * | 1/1984 | Chillis | ............................. | 70/39 |
| 5,070,712 A | * | 12/1991 | Fox | ................................. | 70/18 |
| 5,347,835 A | * | 9/1994 | Dewey | ........................ | 70/202 |
| 5,511,399 A | * | 4/1996 | Lynn | ............................. | 70/19 |
| 6,018,968 A | * | 2/2000 | Sides | ............................. | 70/14 |
| 6,438,885 B1 | * | 8/2002 | Murray et al. | ............. | 42/70.07 |
| 6,622,532 B2 | * | 9/2003 | Hsu | ................................ | 70/14 |

FOREIGN PATENT DOCUMENTS

WO    WO 96/33902    10/1996

* cited by examiner

Primary Examiner—John B. Walsh
(74) Attorney, Agent, or Firm—Young & Thompson

(57) ABSTRACT

A clamp for preventing theft of a motor cycle, by disabling operation of a handlebar brake lever comprises: a pair of jaws connected together at a pivot so as to be movable between an open and a closed condition, the jaws providing when in the closed condition, first and second substantially parallel apertures and through the clamp, the first aperture being shaped to receive a handlebar handgrip portion therethrough, and the second aperture being formed in a movable member and positioned so as to receive a brake or clutch lever operably mounted on the handlebar. The clamp also has a locking device for enabling the jaws to be locked in the closed condition. The movable member is locked at optional positions when the jaws are in the closed condition, by a pair of ribs which engage into a series of transverse grooves formed in the jaw along the length thereof.

14 Claims, 3 Drawing Sheets

ANTI-THEFT CLAMP FOR A MOTOR CYCLE HAND BRAKE LEVER

TECHNICAL FIELD

This invention relates to a clamp and has been devised particularly although not necessarily solely for the use as a clamp for use in association with motor cycle handlebars, handlebar grips and the operating mechanisms mounted thereon.

BACKGROUND ART

Various devices have been devised for preventing theft or operation of cycles or motor cycles, by disabling operation of a handlebar control lever. For example U.S. Pat. No. 4,426,861 to Chillis, U.S. Pat. No. 5,347,835 to Dewey, U.S. Design Pat. No. 351,983 to Young et. al., U.S. Pat. No. 5,511,399 to Lynn, and U.S. Design Pat. No. 402,180 to Chappell (the present applicant).

All of these devices are addressed to immobilizing the hand brake lever or a similar lever of a motor cycle of the like, by attempting to secure this in relation to the handlebar grip region. However, all of these devices except those of Chappell and Young et. al. comprise two or more components which must be fitted together in use, making handling difficult. The devices of Chappell and Young et. al. comprise two members hinged together, thus simplifying handling. However, neither of these devices have means for fine adjustment of a handlebar control lever such as a brake lever or clutch, in relation to the handlebar. Such fine adjustment can be an advantage in ensuring the brake is locked on in all cases, irrespective of the condition of the brake lever adjustment, and irrespective of different dimensions for different makes of bicycles. Moreover, when used with a clutch lever, this fine adjustment enables the clutch to be locked in a desired position.

Another desirable feature of an anti-theft device is one which can securely lock rotation of the handlebar grip region, which in the case of a twist grip throttle, would provide further security in preventing the engine from being operated. Again neither of the designs of Chappell or Young et. al. have adjustment means to achieve this.

DISCLOSURE OF THE INVENTION

It is therefore an object of the present invention to provide a clamp which will go at least some way towards meeting the foregoing requirements in a simple yet effective manner, or which will at least provide the public with a useful choice.

Accordingly in one aspect the invention may broadly be said to consist in a clamp comprising:

a pair of jaws pivotally connected together at one end so as to be movable between an open and a closed condition, the jaws providing when in the closed condition, first and second substantially parallel apertures through the clamp, the first aperture being shaped to receive a handgrip portion of a handlebar therethrough so as to bear against an operable wall thereof, and the second aperture being positioned so as to receive a control lever operably mounted on the handlebar;

a locking device for enabling the jaws to be locked in the closed condition;

a movable member defining an operable wall of the second aperture and mounted on one of the jaws so as to be movable relative thereto so as to vary a spacing between the operable walls of the apertures;

a guide device for guiding movement of the movable member along a longitudinal direction of the jaw; and a securing device for securing a position of the movable member relative to the jaw, when the jaws are in the closed condition.

With such a construction, the jaws can be pivoted open and a handgrip portion of a handlebar such as a throttle twist grip of a motor cycle then fitted into the first aperture. A control lever such as a brake or clutch lever operably mounted on the handlebar of the motor cycle can then be fitted into the second aperture and the movable member moved so as to reduce the spacing between the apertures with the operable wall of the second aperture bearing against the brake or clutch lever, and the operable wall of the first aperture bearing against the handgrip portion, thereby holding the brake in an on position, or preventing movement of the clutch lever. The jaws can then be moved to the closed condition and the position of the movable member secured relative to the jaws by the securing device, thereby preventing release of the clutch or brake lever. Once in the closed condition the locking device is operated so as to lock the jaws together.

The guide device may comprise any suitable device whereby the movable member may be guided relative to the jaw on which it is mounted to ensure that the control lever is positioned at a desired position, for example in the case of a brake lever, at a position where the brakes are locked on.

For example this may comprise a longitudinally aligned wall formed on one of the jaws and a longitudinally aligned wall formed on the movable member, and a locating device for locating the longitudinally aligned walls in sliding engagement with each other.

The securing device may comprise any suitable device whereby the movable member may be secured in position once the control lever has been moved to a desired position.

For example this may comprises a plurality of first depressions spaced apart in one of the jaws in the longitudinal direction, and a first protrusion on one side of the movable member which is able to be positioned in any one of the first depressions.

The movable member may be in the form of a block with one face thereof defining the operable wall of the second aperture. Alternatively the movable member may be formed with a cut-out, with one wall of the cut-out defining the operable wall of the second aperture.

The securing device may further comprise a plurality of second depressions spaced apart in the other of the jaws in the longitudinal direction, and a second protruding device on the other side of the movable member which is able to be positioned in any one of the second depressions.

In the case where the movable member is formed with a cut-out, the second protruding device may comprises an extension of at least one wall of the cut-out.

The locating device of the guide device may comprise a protrusion extending from a base of the movable member, an elongate slot formed in the jaw for accommodating the protrusion, and a retention device for retaining the protrusion in the slot once inserted therein. For example the retention device may be in the form of a bulbous portion on the end of the protrusion which is a snap fit through the slot. Alternatively this may comprise a screw and washer, the screw being threaded into an aperture in the protrusion, and the washer holding the screw in place. In the case of a washer, this may have a predetermined resilience to enable the movable member to be moved between detent positions of the securing device.

In the case where the washer has resilience, then preferable the first protrusion is positioned away from a centre of the cut-out in a longitudinal direction. By so doing, the first protrusion can be easily disengaged from the depression by tilting the movable member against the resilience of the washer.

According to another aspect of the invention there is provided a clamp substantially as described above, wherein the first aperture is further provided with a device for removably securing a spacer for adjusting a size of the first aperture. By providing a device for removably securing a spacer, the size of the aperture can be adjusted, enabling the clamp to be used with a variety of hand grip sizes.

The locking device may comprise any suitable device whereby the jaws can be locked together in the closed condition, or a device which can be used for fitting a locking device. For example this may comprise a housing for receiving a lock mechanism, and an engaging device for engaging with a lock pin of the lock mechanism when this is fitted to the housing.

Moreover, for example this may comprise an aperture formed in one of the jaws and a pin adapted for insertion in the aperture when the jaws are in the closed condition, and a device operable by a key for securing the pin when inserted in the aperture.

Preferably the aperture is aligned with a longitudinal direction of the jaws. With such an arrangement the lock can be easily operated by inserting a key from the end of the clamp. However, the aperture may be aligned at an angle to the longitudinal direction as desired or required.

This invention may also broadly be said to consist in the parts, elements and features referred to or indicated in the specification of the application, individually or collectively, and any or all combinations of any two or more of the parts, elements or features, and where specific integers are mentioned herein which have known equivalents such equivalents are deemed to be incorporated herein as if individually set forth.

BRIEF DESCRIPTION OF THE DRAWINGS

Preferred embodiments of the invention will now be described with reference to the accompanying drawings in which.

BEST MODES FOR CARRYING OUT THE INVENTION

Figure 2:
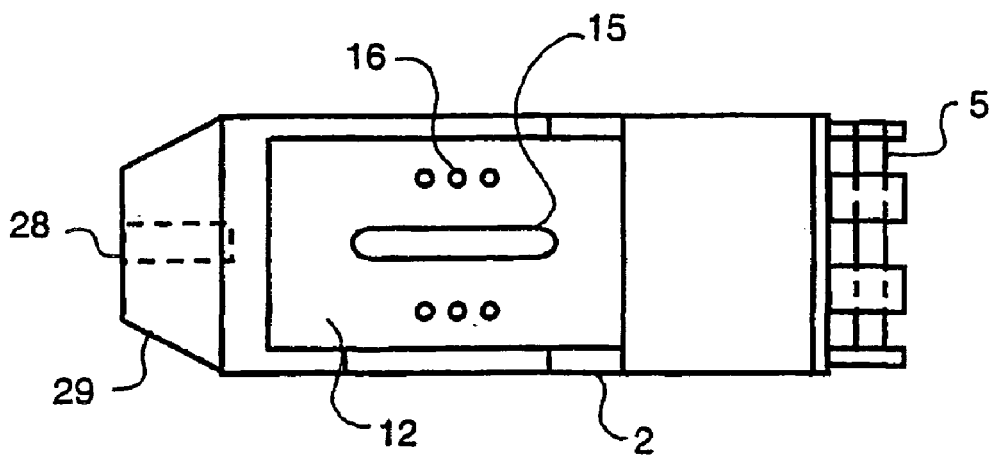
FIG. 2 is a plan view of the lower jaw of FIG. 1.
Figure 1:
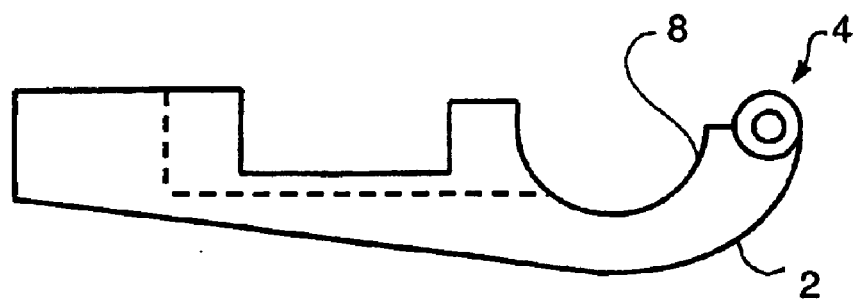
FIG. 1 is a side elevation of a lower jaw forming part of a clamp according to a preferred form of the invention.
Figure 3:
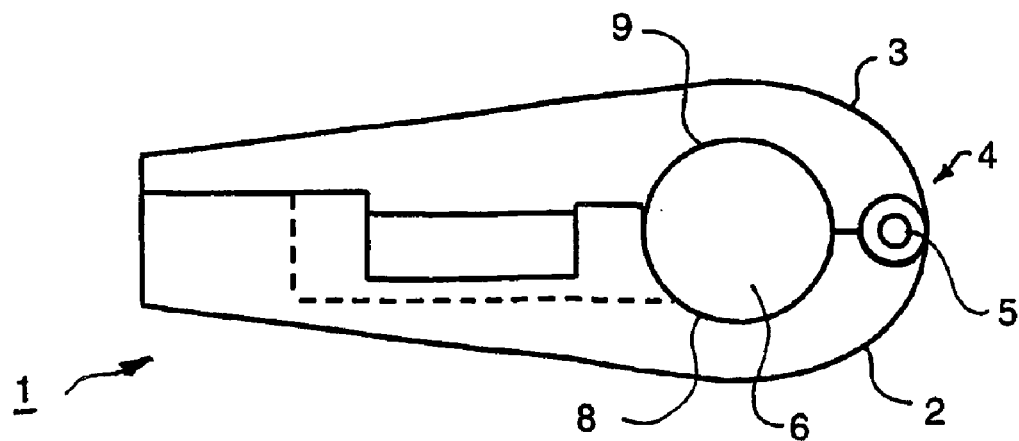
FIG. 3 is a side elevation of the clamp of the invention in a closed condition with a movable member which provides an operable wall of a second aperture removed.

Referring to FIG. 1 to FIG. 4, a clamp according to an embodiment of the present invention generally indicated by arrow 1, comprises a lower jaw 2 and an upper jaw 3. The lower and upper jaws 2 and 3 are connected at a pivot 4 which may be formed using known hinge techniques, for example inter-leaved members with a bore therethrough into which a hinge pin 5 is positioned. The hinge pin 5 should not be readily removable once in position.

A pair of apertures 6 and 7 (FIG. 4) are provided with axis thereof substantially parallel, and passing through the jaws 2 and 3 when in the closed condition. The aperture 6 is desirably provided by concave recesses 8 and 9 in the lower jaw 2 and upper jaw 3 respectively, which meet together so that the aperture 6 in the preferred form is substantially circular and able to be a close fit around a handgrip portion of a handlebar, such as that of a motor cycle or snow mobile, especially the throttle twist grip portion of the handlebar. The second aperture 7 is desirably provided by a movable member in the form of a sliding block 10. Here the aperture 7 is provided by a cut-out 11 in the block 10 and the block 10 moves in a channel 12 (FIG. 2) provided in the jaw 2. The block 10 is desirably provided with a downwardly depending tongue 13 with a bulbous end part 14 (FIG. 5) which is a snap fit through a slot 15 in a central bottom region of the channel 12 of the jaw 2. Thus the movement of the block 10 with respect to the jaw 2 is contained along a line determined by the elongated narrow shape of the slot 15 and the elongated length of the tongue 13 (longitudinally aligned walls). The tongue 13, the slot 15 and the bulbous end part 14 thus form a means for locating the longitudinally aligned walls in sliding engagement with each other and also provide a means for guiding the movement of the block 10 along a longitudinal direction of the jaw 2. The block 10 may also be held in place by means of a screw or other device suited for the purpose of retaining the block 10 in place in the channel 12, as discussed later with reference to FIG. 7

In order to provide a number of selected positions, a pair of nipples 15a are provided on the underside of the block 10 which are able to be positioned in depressions, for example depressions 16 in the jaw 2. Of course the nipples 15a and the depressions 16 could be reversed.

Figure 4:
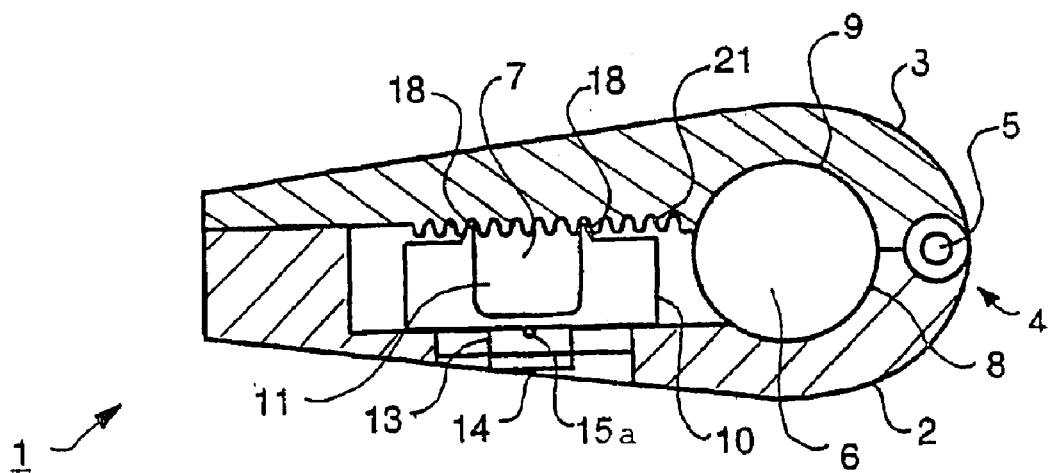
FIG. 4 is a longitudinal section view of the clamp of FIG. 3, also showing the movable member which provides an operable wall of the second aperture, with details of a locking mechanism omitted.
Figure 5:
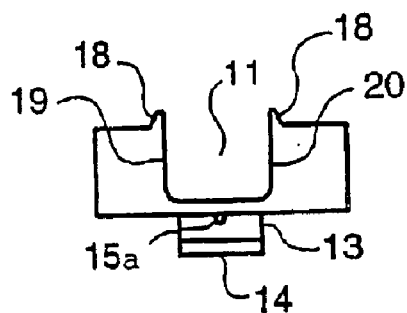
FIG. 5 is a side elevation of the movable member.
Figure 6:
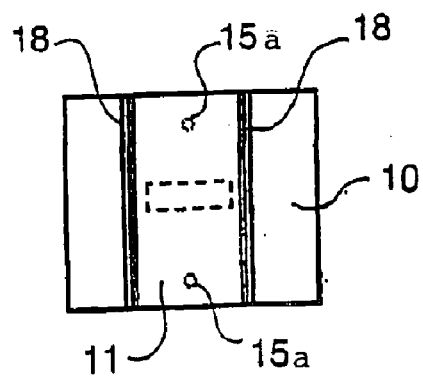
FIG. 6 is a plan view of the movable member of FIG. 5.

In order to accurately position and secure the block 10, the block 10 is provided with a securing device which may comprise a pair of ribs 18 on the upper surface of the block 10. As shown in FIG. 5, these ribs 18 comprise an extension of the walls 19 and 20 of the cut-out 11. The ribs 18 engage into a selected pair of a plurality of transverse grooves 21 (FIG. 4) formed in the other jaw 3. Thus when the jaws 2 and 3 are open, the block 10 is able to be positioned in the most suitable position, and when the jaws 2 and 3 are closed the block 10 may be locked into a set position. The pitch and location of the depressions 16 and the transverse grooves 21 are determined so as to correctly position the block 10 for when the jaws 2 and 3 are moved to the closed condition.

Figure 7:
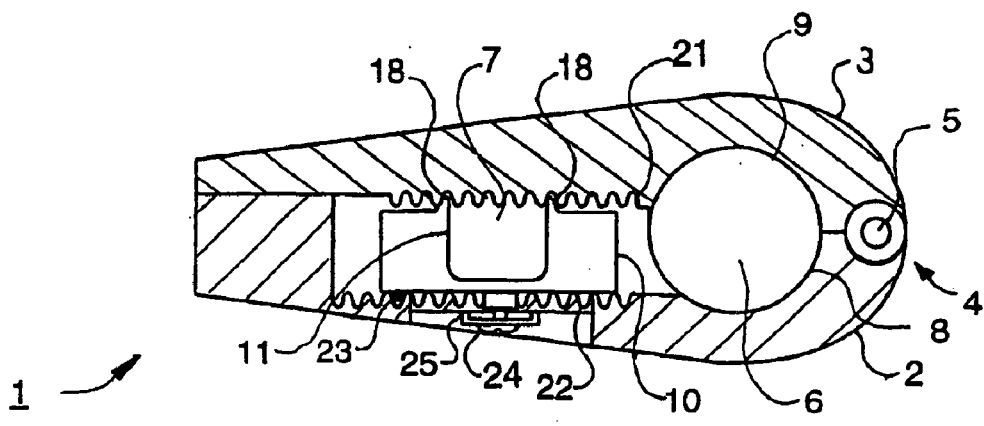
FIG. 7 is a longitudinal section view showing an alternative locating device for locating the movable member.

FIG. 7 shows an alternative arrangement for a securing device and a locating device for securing and locating the movable member (block 10). Parts the same as for the previous arrangement are denoted by the same reference numerals. Again in FIG. 7, as with FIG. 4, details of a lock mechanism are omitted.

In this case, instead of the depressions 16, a series of transverse grooves 22 similar to the transverse grooves 21 on the upper jaw 3 are also formed on the lower jaw 2, and instead of the nipples 15a, a pair of short transverse ribs 23 are provided on the base of the block 10 for engaging in the transverse grooves 22. Moreover a screw 24 is used to hold the block 10 in place, and a resilient washer 25 is provided, for example in the form of an inverted channel with an aperture in the middle. By having a predetermined resilience for the washer 25, the block 10 can be moved between detent positions where the ribs 23 are positioned in one of the grooves of the series of transverse grooves 22, by separating the block 10 slightly from the bottom wall of the channel 12.

In this case, preferable the pair of short transverse ribs 23 are positioned far away from the centre of the cut-out 11 in a longitudinal direction, preferably towards the end away from the aperture 6. By so doing, the ribs 23 can be easily disengaged from the transverse grooves 22 by tilting the block 10 against the resilience of the washer 25.

The upper and lower jaws 2 and 3 are locked together by a locking mechanism (FIG. 2) desirably provided at the end of the clamp 1 remote from the hinge pin 5. This may include a depression 28 and an angled or straight protrusion 29 and a suitable matching pair (not shown) on the other jaw 3. The depression 28 and the part (not shown) on the jaw 3 carry a suitable lock preferably key operated.

The lock may thus comprise an aperture formed in one of the jaws 2 or 3 and a pin adapted for insertion in the aperture when the jaws 2 and 3 are in the closed condition, and a device operable by a key for securing the pin when inserted in the aperture.

Figure 8:
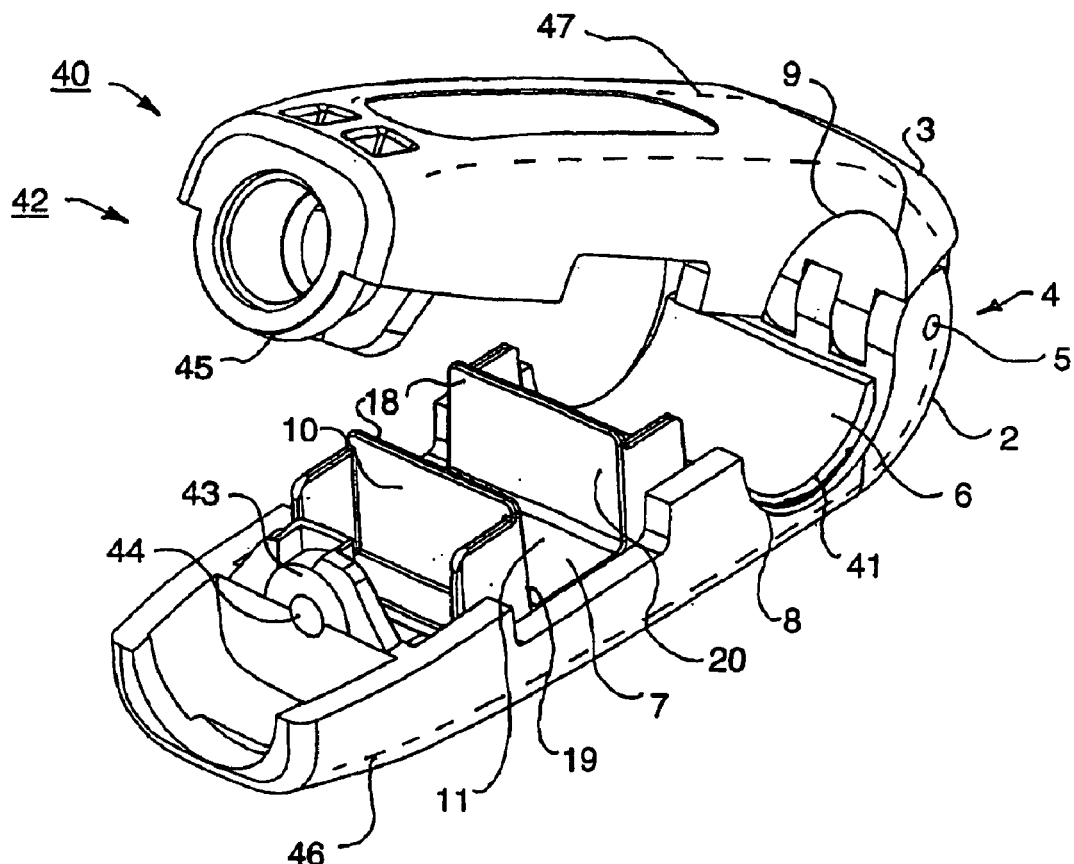
FIG. 8 is a perspective view of a second embodiment of the present invention.

FIG. 8 shows another embodiment of a clamp according to the present invention. Parts in FIG. 8 having the same construction or function as in the previous drawings are denoted by the same reference symbols.

As shown in FIG. 8, a clamp 40 according to the second embodiment comprises jaws 2 and 3 as with the first embodiment pivotally connected together at a pivot 4 so as to be movable between an open and a closed condition. The jaws 2 and 3 provide first and second substantially parallel apertures 6 and 7 through the clamp 40. The first aperture 6 is shaped to receive a handgrip portion of a handlebar therethrough so as to bear against an operable wall thereof (the wall region on the pivot 4 side), and the second aperture 7 formed in a cut-out 11 of a movable block 10, is positioned so as to receive a control lever such as a brake or clutch lever operably mounted on the handlebar.

In the embodiment of FIG. 8, the first aperture 6 is further provided with a device for removably securing a spacer 41 for adjusting a size of the aperture 6. Here the spacer 41 is formed from a resilient material such as synthetic rubber, and is removably secured to the clamp 40 by having protruding lugs (not visible) moulded thereon which fit into recesses (not visible) in the wall of the aperture 6. Preferably two of such spacers 41 are fitted to the aperture 6, one for each of the concave recesses 8 and 9. These spacers 41 compensate for possible varying diameters of handlebar grips or throttle twist grips, and also for gradual wear of the handlebar grip portion. It is envisaged that two or more sizes and shapes of spacers 41 would be supplied with the clamp 40 so that a suitable spacer could then be selected. It should be noted however, that the first aperture may be sized to provide suitable clamping on a handgrip, without the need for the spacer 41, or with only one spacer 41.

In the embodiment of FIG. 8, a locking device generally indicated by arrow 42 comprises a tongue 43 formed on the lower jaw 2 and formed with an aperture 44 aligned with a longitudinal direction of the jaw 2, and a housing 45 for accommodating a key operated lock mechanism (not fitted) formed on the other jaw 3. The arrangement is such that when the lock mechanism is fitted into the housing 45, a pin of the lock mechanism can be inserted into the aperture 44 when the jaws 2 and 3 are in the closed condition, and secured in position, thus locking the jaws 2 and 3 together.

With the embodiment of FIG. 8, the aperture 44 is longitudinally aligned, however depending on requirements, the housing 45 and the aperture 44 may be aligned at any suitable angle.

Dotted lines 46 and 47 in FIG. 8 indicate hardened metal rods which are embedded in a plastics moulding forming the jaws 2 and 3 at the time of moulding, extending along the longitudinal direction of the jaws 2 and 3. These rods 46 and 47 are to prevent cutting through of the plastics material of the jaws 2 and 3 by someone attempting to cut open the clamp 40. Alternatively or in addition to rods, hardened metal objects or particles may also be embedded at the time of moulding the jaws 2 and 3.

In use the jaws 2 and 3 are moved to the open position and the lower jaw 2 for example is positioned for example about a throttle twist grip of a motor cycle handlebar. Then as the upper jaw 3 is closed, the block 10 is moved into the most desirable position to catch or hold for example the brake lever of the motor cycle which desirably is clamped for example in the on or locked position. The jaws 2 and 3 are then completely brought together substantially as shown in FIG. 4 and the lock mechanism operated to lock the jaws together.

When the jaws 2 and jaw 3 are brought completely together the jaws may for example firmly hold the throttle twist grip of the motorcycle between the concave recesses 8 and 9 with the motorcycle brake lever positioned in the cut-out 11, thus preventing twisting of the twist grip throttle, making the motor cycle accelerator inoperable and holding the motor cycle brake in the on position. Depending on the size of the aperture 6, one or more appropriate spacers 41 can be selected and fitted to ensure a firm grip on the twist grip portion of the handlebar.

In order to remove the clamp, the lock mechanism (for example 42) is disengaged, the jaws 2 and 3 opened and the clamp then removed.

INDUSTRIAL APPLICABILITY

The clamp of the invention is easily manufactured in a simple manner comprising only three main parts, namely the two jaws and the sliding block, plus any locking mechanism. Once assembled the clamp comprises a single unit which is able to be opened and closed in a simple manner and yet provide a substantial measure of security for a motor cycle or similar device. The invention thus has considerably industrial applicability.

What is claimed is:

1. A clamp comprising:

a pair of jaws pivotally connected together at one end so as to be movable between an open and a closed condition, said jaws each being formed as integral members and providing when in said closed condition, first and second substantially parallel apertures through said clamp and completely enclosed by said jaws, said first aperture being shaped to receive a handgrip portion of a handlebar therethrough so as to bear against an operable wall thereof, and said second aperture being positioned so as to receive a control lever operably mounted on said handlebar;

a locking device structured and arranged to cooperate with a locked mechanism that enables said jaws to be locked in said closed condition, when said clamp is fitted with a lock mechanism;

a movable member provided inside said second aperture and defining an operable wall of said second aperture and mounted on one of said jaws so as to be movable relative thereto so as to vary a spacing between said operable walls of said apertures;

guide means for guiding movement of said movable member along a longitudinal direction of said jaw; and securing means for securing a position of said movable member relative to said jaw, when said jaws are in said closed condition, wherein said guide means comprises a longitudinally aligned wall formed on one of said jaws and a longitudinally aligned wall formed on said movable member, and locating means for locating said longitudinally aligned walls in sliding engagement with each other.

2. A clamp according to claim 1, wherein said securing means comprises a plurality of first depressions spaced apart in one of said jaws in the longitudinal direction, and a first protrusion on one side of said movable member which is able to be positioned in any one of said first depressions.

3. A clamp according to claim 1, wherein said movable member is formed with a cut-out, with one wall of said cut-out defining said operable wall of said second aperture.

4. A clamp according to claim 1, wherein said securing means further comprises a plurality of second depressions spaced apart in the other of said jaws in the longitudinal direction, and second protruding means on the other side of said movable member which is able to be positioned in any one of said second depressions.

5. A clamp according to claim 4, wherein said second protruding means comprises an extension of at least one wall of said cut-out.

6. A clamp according to claim 2, wherein said locating means comprises a protrusion extending from a base of said movable member, an elongate slot formed in said jaw for accommodating said protrusion, and retention means for retaining said protrusion in said slot once inserted therein.

7. A clamp according to claim 6, wherein said retention means comprises a screw and washer, said screw being threaded into an aperture in said protrusion, and said washer holding said screw in place, said washer having a predetermined resilience to enable said movable member to be moved between detent positions of said securing means.

8. A clamp according to claim 7, wherein said first protrusion is positioned away from a centre of said cut-out in a longitudinal direction.

9. A clamp according to claim 1, wherein said first aperture is further provided with means for removably securing a spacer for adjusting a size of said first aperture.

10. A clamp according to claim 9, further comprising a spacer formed from a resilient material and removably secured to said clamp by said securing means.

11. A clamp according to claim 9, wherein said securing means involves providing protruding lugs on the spacer and recesses in the wall of said first aperture for accommodating the protruding lugs.

12. A clamp according to claim 1, wherein said locking means comprises a housing for receiving a lock mechanism, and an aperture for engaging with a lock pin of said lock mechanism when this is fitted to said housing.

13. A clamp according to claim 12, wherein said aperture is aligned with a longitudinal direction of said jaws.

14. A clamp according to claim 1, wherein said jaws are moulded from a plastics material with a hardened metal embedded therein along the longitudinal direction of said jaws.

* * * * *